(12) United States Patent
Rakoto-Sam et al.

(10) Patent No.: US 12,411,300 B2
(45) Date of Patent: Sep. 9, 2025

(54) CASSETTE WITH REVERSIBLE SECURING COMPONENT AND SYSTEM

(71) Applicant: BELDEN CANADA ULC, Saint-Laurent (CA)

(72) Inventors: Lucas Rakoto-Sam, Montreal (CA); Simon Lyonnais-Bourque, Montreal (CA); Dwayne Crawford, Pointe-Claire (CA)

(73) Assignee: BELDEN CANADA ULC, Saint-Laurent (CA)

( * ) Notice: Subject to any disclaimer, the term of this patent is extended or adjusted under 35 U.S.C. 154(b) by 143 days.

(21) Appl. No.: 17/932,560

(22) Filed: Sep. 15, 2022

(65) Prior Publication Data

US 2023/0084170 A1 Mar. 16, 2023

Related U.S. Application Data

(60) Provisional application No. 63/261,222, filed on Sep. 15, 2021.

(51) Int. Cl.
*G02B 6/38* (2006.01)
*G02B 6/44* (2006.01)
*G02B 6/46* (2006.01)

(52) U.S. Cl.
CPC ........... *G02B 6/4453* (2013.01); *G02B 6/562* (2023.05)

(58) Field of Classification Search
CPC ..................................................... G02B 6/562
USPC ......................................................... 385/135
See application file for complete search history.

(56) References Cited

U.S. PATENT DOCUMENTS

| | | | | |
|---|---|---|---|---|
| 5,996,149 | A * | 12/1999 | Heimbrock | A61B 6/04 5/601 |
| 2006/0150458 | A1* | 7/2006 | Feroli | G09F 3/18 40/661 |
| 2009/0074498 | A1* | 3/2009 | Nakai | B41J 35/24 400/208 |
| 2014/0068641 | A1* | 3/2014 | Kuroda | G11B 15/68 720/730 |
| 2014/0314384 | A1* | 10/2014 | Nair | G02B 6/4446 385/135 |

(Continued)

FOREIGN PATENT DOCUMENTS

| | | | | |
|---|---|---|---|---|
| CA | 3221718 A1 * | 4/2019 | ........... | G02B 6/4455 |
| WO | WO-2017083256 A1 * | 5/2017 | ........... | G02B 6/4452 |

*Primary Examiner* — Kaveh C Kianni
(74) *Attorney, Agent, or Firm* — MH2 Technology Law Group, LLP

(57) ABSTRACT

A reversible fiber optic cassette for mounting in a rack comprising a cassette receiving tray, the tray comprising a plurality of cassette engaging features is disclosed. The cassette comprises a cassette body comprising optic fiber receptacles arranged along a front of thereof, a multifiber receptacle along a back thereof and a plurality of optic fiber segments each between a respective one of the optic fiber receptacles and the multifiber receptacle, and a securing component comprising a main part comprising a first surface and a second surface opposite the first surface, a cassette engaging part extending from the first surface for engaging with the cassette body, a tray engaging feature extending from the second surface and engageable with one of the cassette engaging features. The reversible securing component is secureable on either side of the cassette body using the cassette engaging feature.

21 Claims, 7 Drawing Sheets

(56) References Cited

U.S. PATENT DOCUMENTS

| | | | |
|---|---|---|---|
| 2016/0077298 A1* | 3/2016 | Wiltjer | G02B 6/4453 |
| 2017/0131500 A1* | 5/2017 | Sauter | G02B 6/4455 |
| 2018/0271632 A1* | 9/2018 | Berg | A61C 3/04 |
| 2019/0101717 A1* | 4/2019 | Pilon | G02B 6/44526 |
| 2019/0162924 A1* | 5/2019 | Fontaine | G02B 6/4452 |
| 2019/0187394 A1* | 6/2019 | Fontaine | G02B 6/44526 |
| 2019/0219786 A1* | 7/2019 | Crawford | G02B 6/562 |
| 2019/0302388 A1* | 10/2019 | Ellison | G02B 6/4455 |
| 2020/0057226 A1* | 2/2020 | Sievers | G02B 6/4455 |
| 2022/0260799 A1* | 8/2022 | Van Baelen | G02B 6/4455 |
| 2022/0260800 A1* | 8/2022 | Van Baelen | G02B 6/4455 |
| 2022/0291469 A1* | 9/2022 | Roa-Quispe | G02B 6/4453 |
| 2023/0384549 A1* | 11/2023 | Pilon | G02B 6/4455 |
| 2024/0036283 A1* | 2/2024 | Vogel | G02B 6/4455 |
| 2024/0126038 A1* | 4/2024 | Enge | G02B 6/4453 |

\* cited by examiner

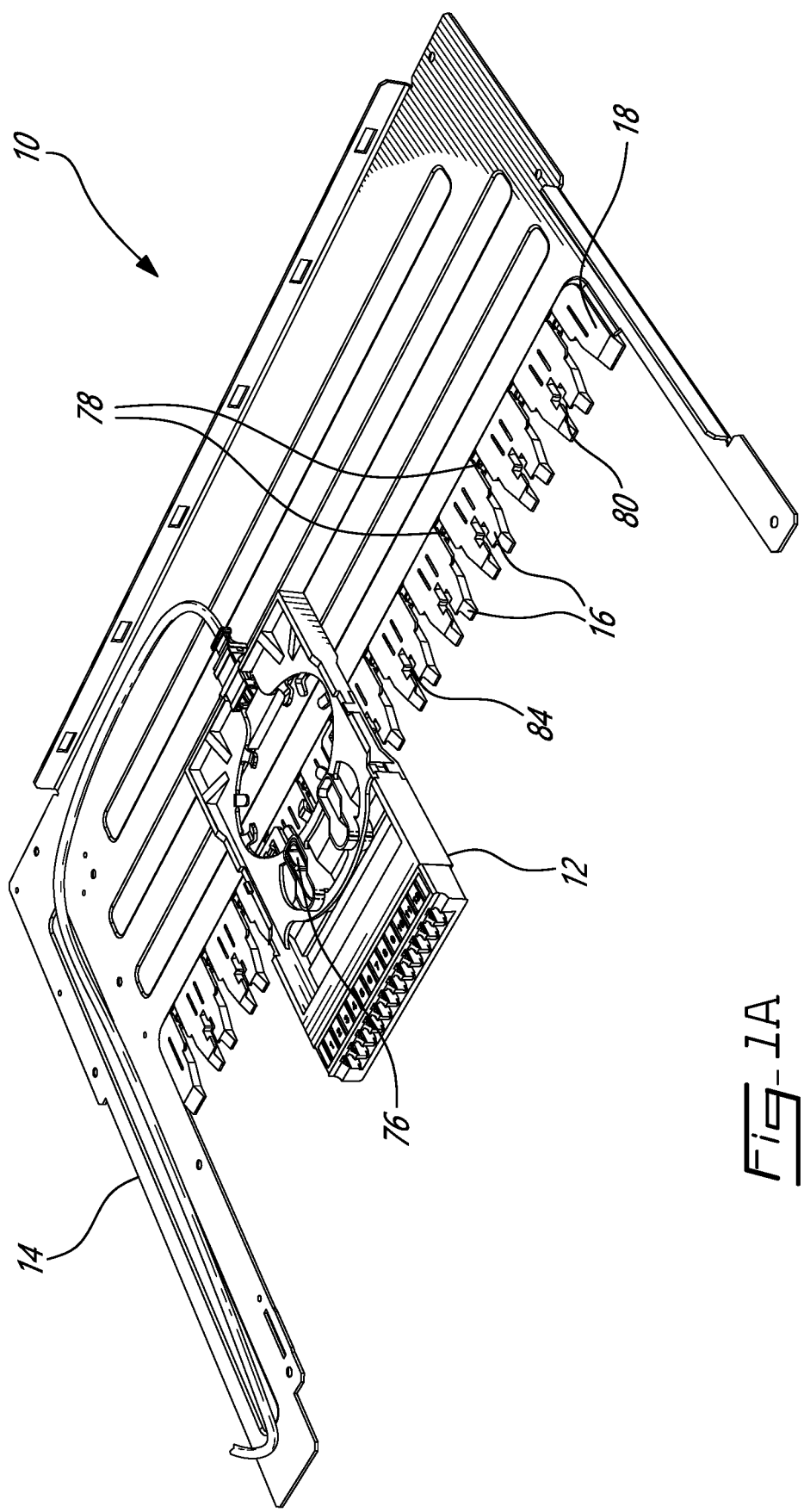
Fig_1A

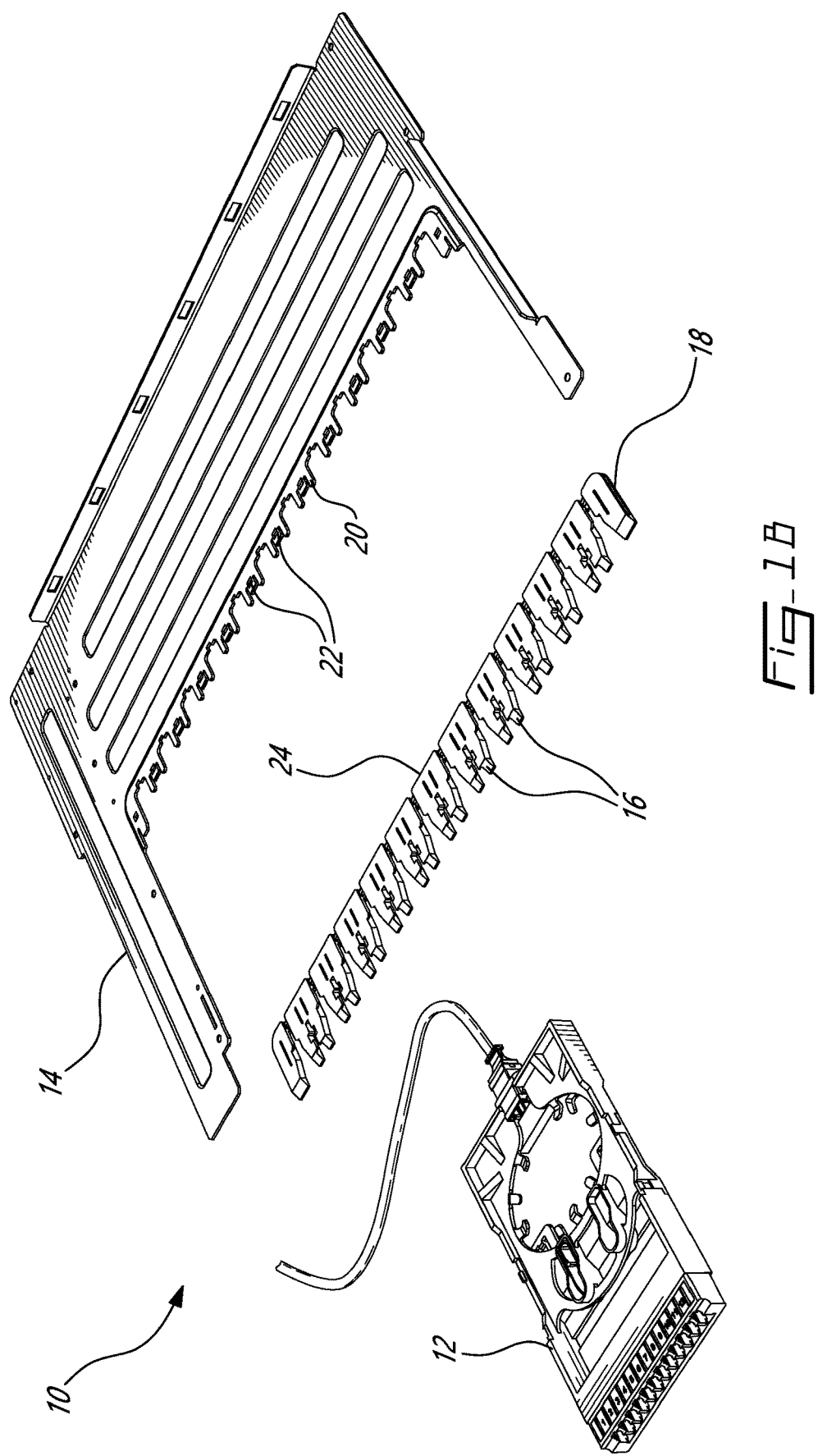

CASSETTE WITH REVERSIBLE SECURING COMPONENT AND SYSTEM

CROSS REFERENCE TO RELATED APPLICATIONS

This Application claims priority under 35 USC § 119(e) of U.S. provisional application Ser. No. 63/261,222 filed on Sep. 15, 2021 which is incorporated herein in its entirely by reference.

FIELD OF THE INVENTION

The present invention relates to a cassette with reversible securing component and system.

BACKGROUND TO THE INVENTION

The prior discloses reversible fiber optic cassettes for use with other cassettes on a tray. One drawback of these prior art cassettes is that they require two sets of features, one on each side of the cassette, in order to secure and remove the cassette from the tray.

SUMMARY OF THE INVENTION

The present addresses the above and other drawbacks by providing a reversible fiber optic cassette for mounting in a rack comprising a cassette receiving tray, the tray comprising a plurality of cassette engaging features. The cassette comprises an elongate cassette body comprising a plurality of optic fiber receptacles arranged along a front of thereof, a multifiber receptacle along a back thereof and a plurality of optic fiber segments, each of the segments between a respective one of the optic fiber receptacles and the multifiber receptacle, and a securing component comprising: a main part comprising a first surface and a second surface opposite the first surface, a cassette engaging part extending from the first surface for engaging with the cassette body, and a tray engaging feature extending from the second surface and engageable with one of the cassette engaging features. The reversible securing component is secureable on either side of the cassette body using the cassette engaging feature.

There is also provided a reversible fiber optic cassette system comprising a tray comprising a plurality of cassette engaging features, and at least one cassette, each of the at least one cassette comprising an elongate cassette body and a reversible securing component comprising a main part comprising a first surface and a second surface opposite the first surface, a cassette part feature extending from the first surface for engaging with the cassette body, and a tray engaging feature extending from the second surface and configured for engaging with one of the cassette engaging features and wherein the reversible securing component is secureable on either side of the cassette body.

Additionally, there is provided a securing component for mounting a cassette to a cassette receiving tray, the tray comprising a plurality of cassette engaging features and the cassette comprising a cassette body. The securing component comprises a main part comprising a first surface and a second surface opposite the first surface, a cassette engaging part extending from the first surface for engaging with the cassette body, and a tray engaging feature extending from the second surface and engageable with one of the cassette engaging features. The reversible securing component is secureable on either side of the cassette body using the cassette engaging feature.

BRIEF DESCRIPTION OF THE DRAWINGS

FIG. 1A provides a raised front right assembled perspective view of a cassette with reversible securing component and system in accordance with an illustrative embodiment of the present invention;

FIG. 1B provides a raised front right exploded perspective view of a cassette with reversible securing component and system in accordance with an illustrative embodiment of the present invention;

DETAILED DESCRIPTION OF THE ILLUSTRATIVE EMBODIMENTS

Figure 2A:
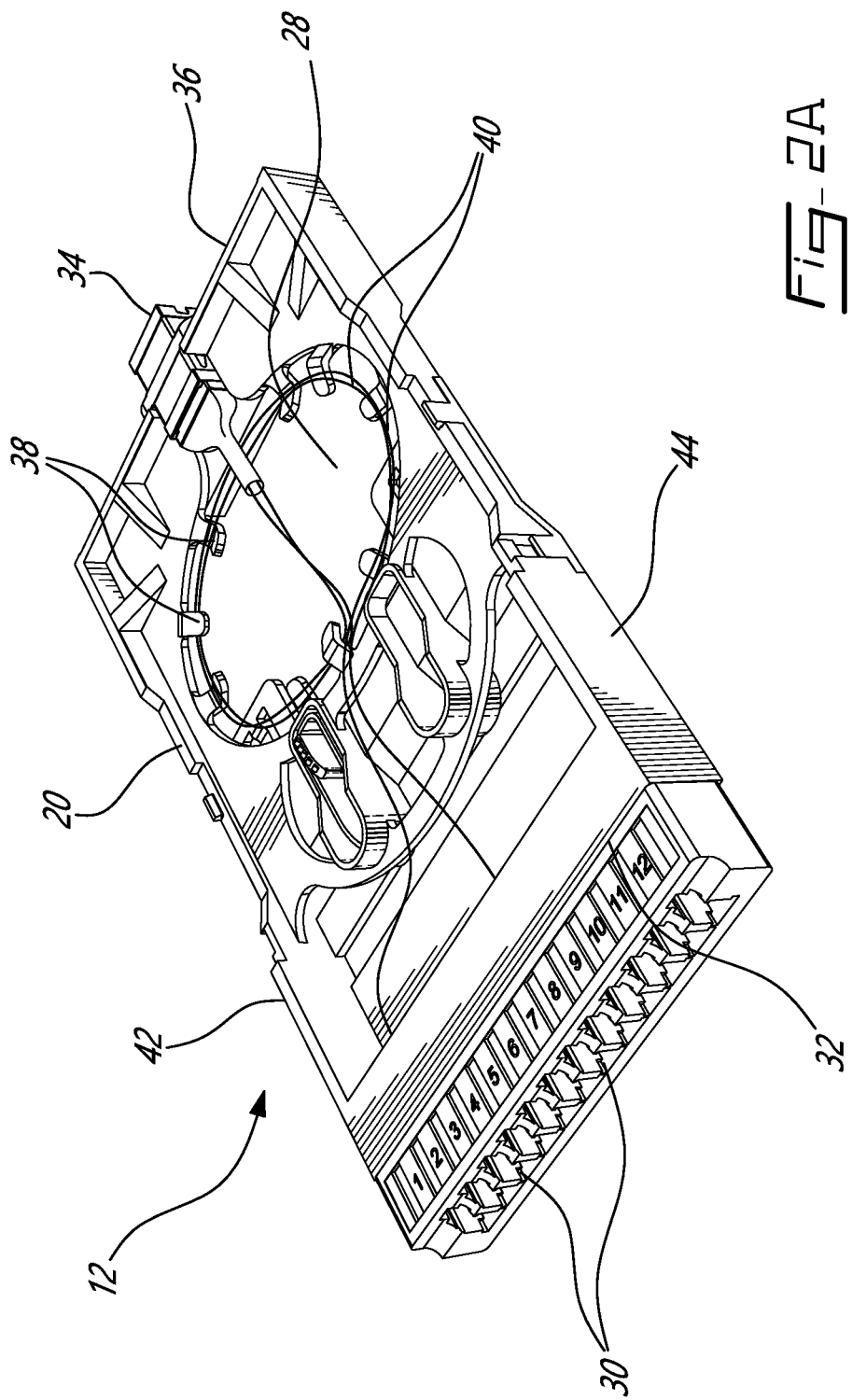
FIG. 2A provides a raised front right perspective view of a cassette with reversible securing component in accordance with an illustrative embodiment of the present invention.

Referring now to FIG. 1A, a reversible fiber optic cassette with reversible securing component and system, generally referred to using the reference numeral 10, will now be described. The system 10 comprises one or more cassettes 12 which are arrangeable side by side and releasably mounted to a tray 14 comprising a plurality of cassette engaging features 16. The tray 14 is typically slideably mounted with other trays in a case which is dimensioned for securing in a 19" inch rack or the like (both not shown).

Referring to FIG. 1B in addition to FIG. 1A the cassette engaging features 16 are illustratively molded as a strip 18 from a rigid material such as plastic and mounted on a forward edge 20 of the tray 14. In this regard, the forward edge 20 of the tray 14 comprises features 22 which engage with molded features (not shown), such as tabs or the like, within the rearward edge 24 of the strip 18. The strip 18 is assembled to the forward edge 20 of the tray 14 by inserting the forward edge 20 in the rearward edge 24 of the strip 18 until the features 22 are engaged by the tabs or the like.

Figure 2B:
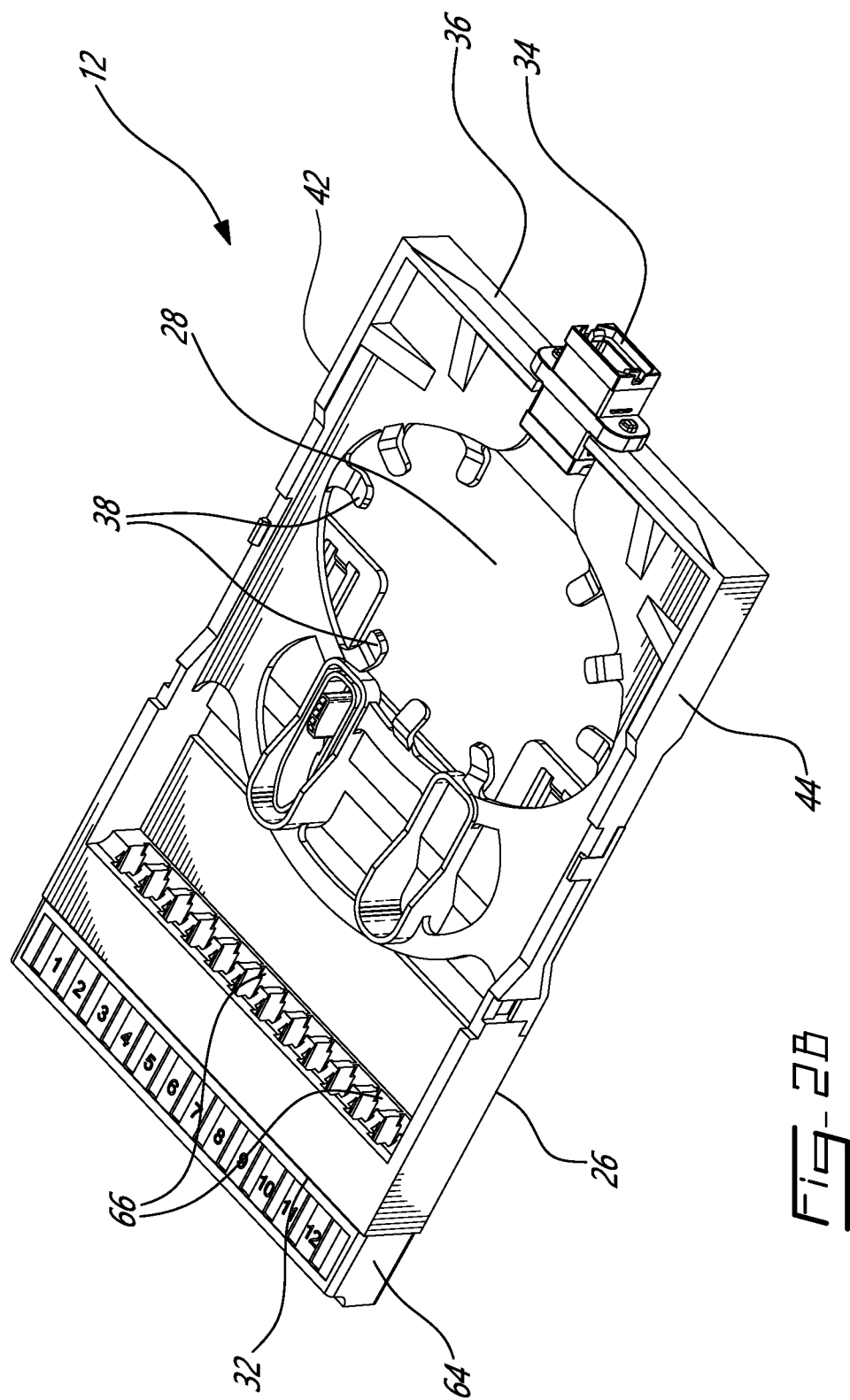
FIG. 2B provides a raised rear right perspective view of a cassette with reversible securing component in accordance with an illustrative embodiment of the present invention.
Figure 2C:
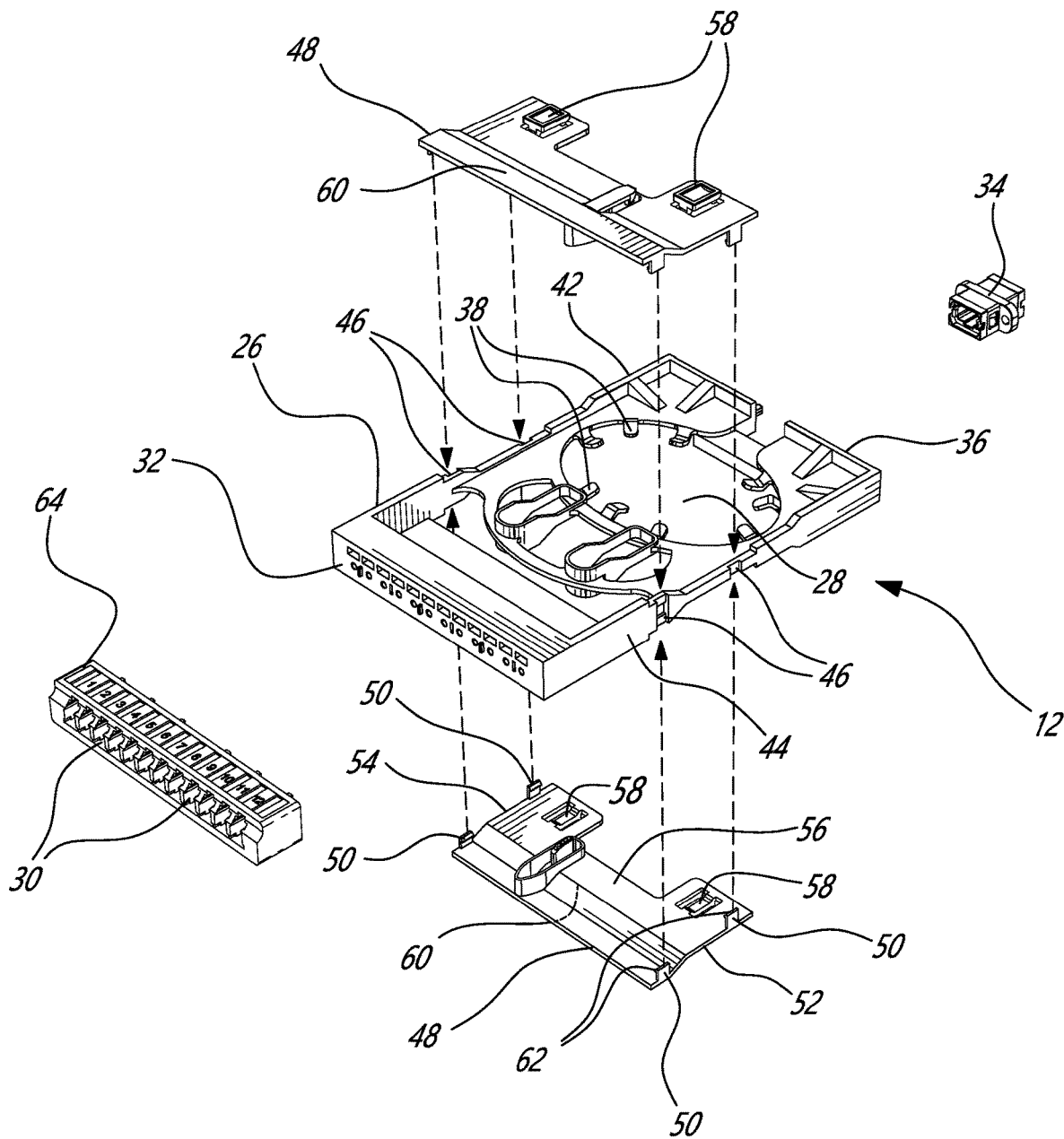
FIG. 2C provides a raised front right exploded perspective view of a cassette with reversible securing component in accordance with an illustrative embodiment of the present invention.

Referring now to FIGS. 2A through 2C, each cassette 12 comprises an elongate cassette body 26 or frame comprising a cable receiving region 28, a plurality of optic fiber receptacles 30 arranged along a front 32 of the cassette body 26 and illustratively a multifiber receptacle 34 arranged along a back thereof 36. In one embodiment the optic fiber receptacles 30 are configured for receiving a standard LC type plug for example terminating a single fiber optic cable or the like (both not shown). Additionally, the spacing between the optic fiber receptacles 30 is such that any two optic fiber receptacles 30 can receive two plugs (also not shown) in a duplex configuration. In one embodiment the multi fiber receptacle 34 is configured for receiving a standard MPO type plug terminating a 12× multi-fiber cable or the like (both not shown). The cable receiving region 28 comprises a plurality of retaining features 38 arranged along a generally circular path to receive and retain a plurality of optic fiber segments 40.

Still referring to FIGS. 2A through 2C, the cassette body 26 further comprises a pair of opposed side edges 42, 44 interconnecting the front 32 and the back 36. Referring to FIG. 2C, each of the side edges 42, 44 comprises a pair of outward facing slots 46 therein. A removable and reversible securing component 48 is also provided which comprises a main part dimensioned to fit sideways across the cassette body 26, illustratively towards a center thereof. The securing component 48 comprises a cassette engaging part for engaging with the cassette body 26 and comprising pairs of opposed flexible fingers 50 positioned along respective outer edges 52, 54 of the securing component 48 extending away from a first surface 56 thereof. Additionally, there are provided a pair of stabilising tabs 58 extending away from a second surface 60 of the securing component 48 and which are engageable with selected ones of the cassette engaging features 16.

Referring to FIG. 2C, the reversible securing component 48 is mountable to a selected side of the cassette body 26 (both mounting options are shown in FIG. 2C, although a person of ordinary skill in the art will understand that only one option is useable at a time) by aligning the flexible fingers 50 with respective ones of the outward facing slots 46 and inserting the flexible fingers 50 into the outward facing slots 46. Hook features 62 on the flexible fingers 50 releasably engage with the opposed side edges 42, 44 thereby removably securing the reversible securing component 48 to the cassette body 26.

Referring to FIGS. 2B and 2C, in one embodiment the receptacles 30 are molded together as a block 64, illustratively a block 64 of twelve (12) LC type receptacles. Similarly, an inside of the front 32 comprises a plurality of receptacles 66 molded or otherwise formed therein. In one embodiment, the receptacles 66 are configured for receiving a standard LC type plug (not shown) for example terminating a single fiber optic cable (reference 40 in FIG. 2A) or the like. The block 64 of receptacles 30 is attached to the front 32 for example by sonic welding, a suitable adhesive or the like and such that the receptacles 30 align with the receptacles 68, with each receptacle 30/receptacle 68 pair acting as a coupler assembly interconnecting optic fibers (not shown) terminated at each receptacle 30, 68 pair and such that the ferrules (not shown) of each of the terminated optic fibers are arranged along the same axis.

Figure 3B:
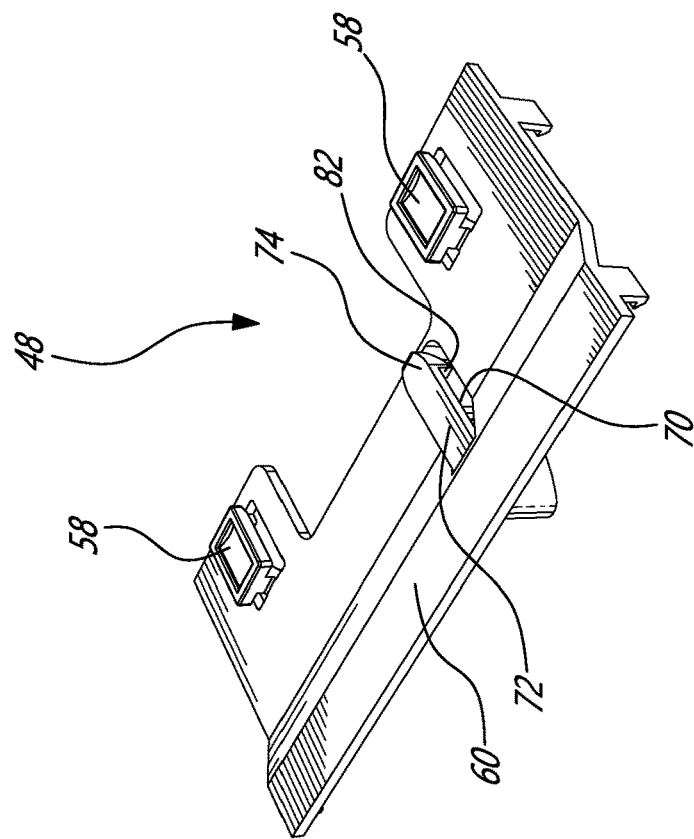
FIG. 3B provides a raised right front perspective view of a reversed securing component in accordance with an illustrative embodiment of the present invention.
Figure 3A:
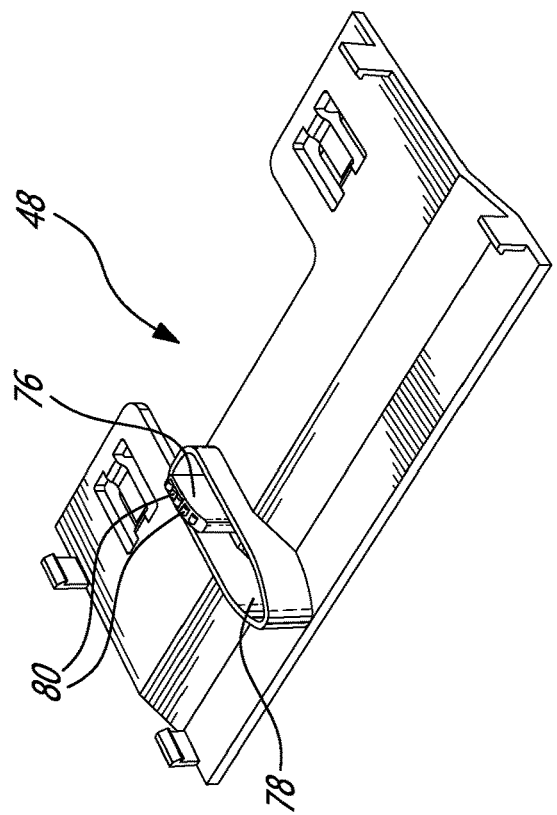
FIG. 3A provides a raised right front perspective view of a securing component in accordance with an illustrative embodiment of the present invention.

Referring now to FIG. 1 and FIGS. 3A and 3B, the reversible securing component 48 further comprises a tray engaging feature 70 comprising a fixed end 72 and a flexible end 74 extending from the second surface 60 of the reversible securing component 48. An actuator 76 is further provided which extends from the flexible end 74 through an aperture 78 in the main part. The actuatable surface of the actuator 76 comprises a series of small bumps 80 to prevent a user's finger from slipping when pressing the actuator 76. As a person of ordinary skill in the art will now understand, the actuatable surface of the actuator 76 is accessible from the accessible side of the cassette 12 when the cassette 12 is installed on the tray 14.

Still referring to FIG. 1 and FIGS. 3A and 3B, on insertion of the cassette 12 onto the tray 14, the stabilising tabs 58 are engaged by respective ones of a plurality of slots 78 in the strip 18 while the actuator 76 is slid into a slot 80 in the selected cassette engaging feature 16 and a hook 82 on the flexible end 74 of the tray engaging feature 70 moves into an aperture 84 in the cassette engaging feature 16. A person of ordinary skill in the art will now understand that the hook 82 is biased into the aperture 84 by the flexible end 74 and such that the cassette 12 is securely held to the tray 14. Similarly, in order to release the cassette 12 from the tray 14, the actuator 76 is depressed thereby biassing the hook 82 out of the aperture 84 in the cassette engaging feature 16 thereby allowing the cassette 12 to be retracted from the tray 14.

Figure 4:
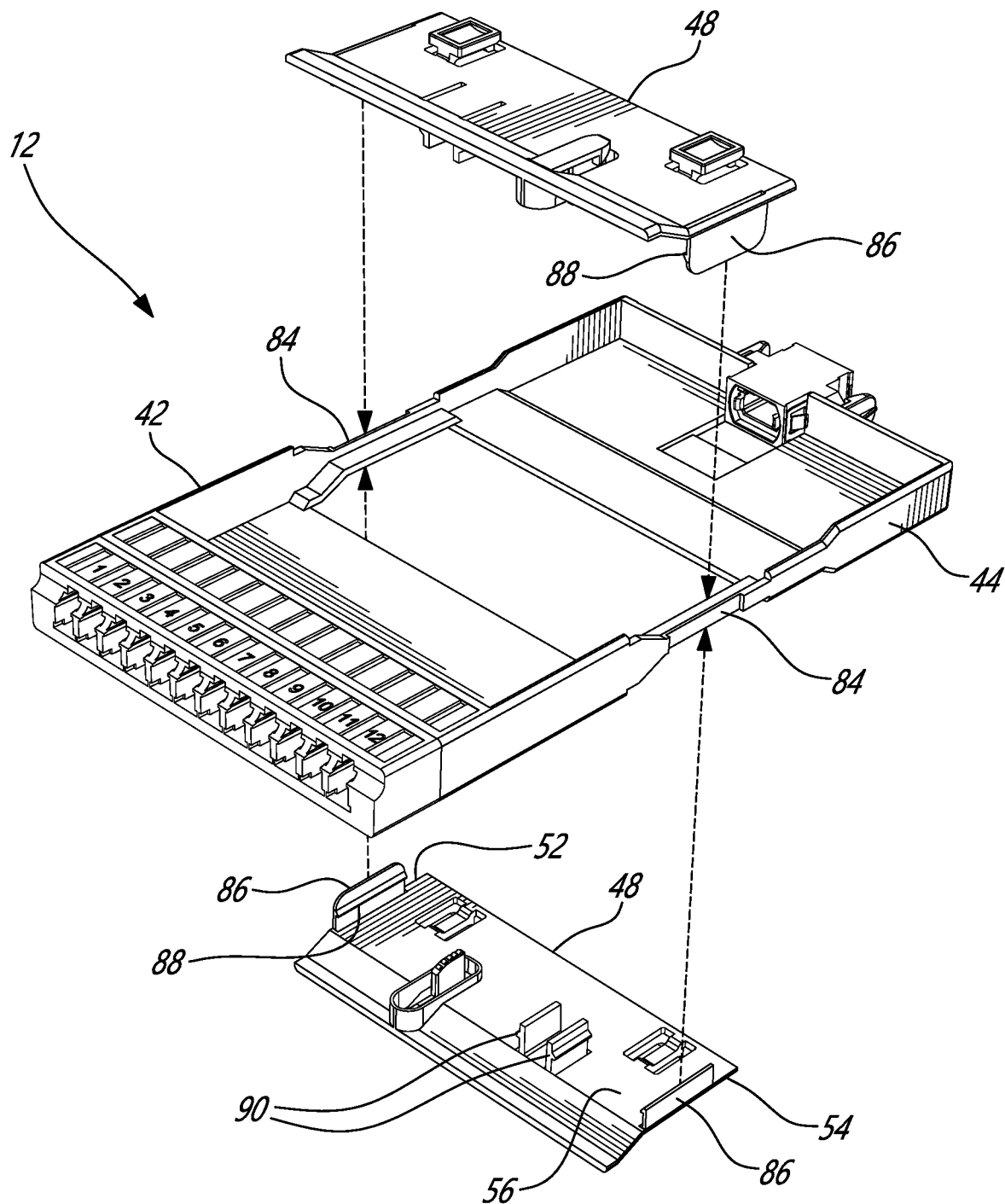
FIG. 4 provides a raised front right exploded perspective view of a cassette with reversible securing component in accordance with an alternative illustrative embodiment of the present invention.

Referring now to FIG. 4, in an alternative embodiment of a cassette 12, each of the side edges 42, 44 comprises an outward facing slot 84 therein. The securing component 48 comprises a pair of opposed flexible tabs 86 positioned on respective outer edges 52, 54 of the securing component 48 and extending away from a first surface 56 thereof. Additionally, there are provided a pair of tray stabilising tabs 58 extending away from a second surface 60 of the securing component 48. The reversible securing component 48 is mountable to a selected side of the cassette body 26 (both mounting options are shown in FIG. 4, although a person of ordinary skill in the art will understand that only one option is useable at a time) by aligning the flexible tabs 86 with respective ones of the outward facing slots 84 and inserting the flexible tabs 86 into the outward facing slots 84. Hook features 88 on the flexible tabs 86 engage with the opposed side edges 42, 44 thereby removably securing the reversible securing component 48 to the cassette body 26. In a particular embodiment, provision can also be made for securing a cable manager or the like (not shown) for example by providing additional securing features 90 on the first surface 56 of the securing component 48.

Although the present invention has been described hereinabove by way of specific embodiments thereof, it can be modified, without departing from the spirit and nature of the subject invention as defined in the appended claims.

The invention claimed is:

1. A securing component for mounting a cassette to a cassette receiving tray, the tray comprising a plurality of cassette engaging features and the cassette comprising a cassette body, the securing component comprising:
   a first surface and a second surface opposite said first surface;
   a cassette engaging part extending from said first surface for engaging with said cassette body;
   a tray engaging feature extending from said second surface and configured to engage with one of the cassette engaging features; and
   wherein said securing component is configured to be secured on either side of said cassette body using said cassette engaging feature.

2. The securing component of claim 1, wherein the tray further comprises a plurality of slots and said first surface further comprises at least one stabilizing tab engageable within the slots.

3. The securing component of claim 1, wherein the cassette body is elongate and said first surface and second surface are each dimensioned to fit sideways across the cassette body.

4. The securing component of claim 3, wherein said first surface and second surface each fits sideways across said cassette body towards a center thereof.

5. The securing component of claim 4, wherein the cassette body further comprises a plurality of optic fiber receptacles arranged along a front of thereof, a multifiber receptacle along a back thereof and a plurality of optic fiber segments, each of said segments between a respective one of the optic fiber receptacles and the multifiber receptacle, a pair of opposed side edges connecting the front and the back and a pair of outward facing slots in each of the opposed side edges and wherein said main part comprises at least one of pair of opposed flexible fingers, one of each of said at least one pair of fingers positioned along each outer side edge of said first surface, said fingers extending away from said first surface for releasable engagement in respective slots in said side edges of said cassette body, and wherein the securing component is secureable on either side of the cassette body by inserting said flexible fingers in respective ones of the outward facing slots.

6. The securing component of claim 1, further comprising an actuator extending from a flexible end of said tray engaging feature through an aperture in said main part for selectively disengaging said tray engaging feature from an engaged one of the cassette engaging features and such that when the securing component is mounted on a first side of the cassette body, said actuator is actuatable from a second side of the cassette body.

7. A securing component for mounting a cassette to a cassette receiving tray, the securing component comprising:
a first surface and a second surface opposite the first surface;
a cassette engaging finger extending from the first surface for engaging with a cassette body;
a tray engaging feature extending from the second surface and configured to engage with a cassette receiving tray; and
wherein the securing component is configured to attach to the cassette body using the cassette engaging finger.

8. The component of claim 7, wherein the securing component further comprises at least one stabilizing tab that is configured to engage with at least one slot in the cassette receiving tray.

9. The component of claim 7, wherein the first surface and second surface are each dimensioned to fit sideways across the cassette.

10. The component of claim 7, wherein the first surface and second surface are each configured to fit sideways across the cassette towards a center thereof.

11. The component of claim 7, wherein the cassette further comprises a plurality of optic fiber receptacles arranged along a front of thereof, a multifiber receptacle along a back thereof and a plurality of optic fiber segments, each of the segments being between a respective one of the optic fiber receptacles and the multifiber receptacle.

12. The component of claim 11, wherein the cassette further comprises a pair of opposed side edges connecting the front and the back and a pair of outward facing slots in each of said opposed side edges and the cassette engaging finger comprises at least one pair of opposed flexible fingers, one of each of the at least one pair of opposed flexible fingers positioned along an outer side edge of the first surface and the second surface, the opposed flexible fingers extending away from the first surface for releasable engagement in respective slots in the side edges of the cassette, wherein the first surface and the second surface are each configured to be secured on either side of the cassette by inserting the flexible fingers in respective ones of the outward facing slots.

13. The component of claim 7, further comprising an actuator extending from a flexible end of the tray engaging feature through an aperture in the first surface for selectively disengaging the tray engaging feature from an engaged cassette engaging finger and such that when the first surface and the second surface are mounted on a first side of the cassette, the actuator is configured to be actuated from a second side of the cassette.

14. A securing component for mounting a cassette to a cassette receiving tray, the securing component comprising:
a first surface and a second surface opposite the first surface;
a cassette engaging finger extending from the first surface for engaging with a cassette;
a tray engaging feature extending from said second surface and configured to engage with a cassette receiving tray;
wherein the cassette receiving tray comprises a slot;
a stabilizing tab configured to operably engage with the slot; and
wherein the securing component is configured to attach to the cassette using the cassette engaging finger.

15. The component of claim 14, wherein the slot is a first slot and the cassette receiving tray further comprises a second slot.

16. The component of claim 14, wherein the cassette receiving tray is structurally configured to retain a plurality of cassettes in a side-by-side arrangement.

17. The component of claim 14, wherein the first surface and second surface are each dimensioned to fit sideways across the cassette.

18. The component of claim 14, wherein the first surface and second surface each fits sideways across the cassette towards a center thereof.

19. The component of claim 14, wherein the cassette further comprises a plurality of optic fiber receptacles arranged along a front of thereof, a multifiber receptacle along a back thereof and a plurality of optic fiber segments, each of the segments being positioned between a respective one of the optic fiber receptacles and the multifiber receptacle.

20. The component of claim 19, wherein the cassette further comprises a pair of opposed side edges connecting the front and the back and a pair of outward facing slots in each of the opposed side edges and the cassette engaging finger comprises at least one of pair of opposed flexible fingers, one of each of the at least one pair of opposed flexible fingers positioned along each outer side edge of the first surface and the second surface, the opposed flexible fingers extending away from the first surface for releasable engagement in respective slots in the side edges of the cassette, wherein the first surface and the second surface are each configured to be secured on either side of the cassette by inserting the flexible fingers in respective ones of the outward facing slots.

21. The component of claim 20, wherein the cassette further comprises an actuator extending from a flexible end of the tray engaging feature through an aperture in the first surface for selectively disengaging the tray engaging feature from an engaged one of the opposed flexible fingers and such that when the first surface and the second surface are mounted on a first side of the cassette, the actuator is configured to be actuated from a second side of the cassette.

* * * * *